United States Patent [19]

Olson

[11] 4,341,405
[45] Jul. 27, 1982

[54] PRONOUNCED FLEXURE COUPLING DEVICES FOR ELONGATE IRRIGATION PIPES

[76] Inventor: Theodore V. Olson, R.R. #4, Atkinson, Nebr. 68713

[21] Appl. No.: 146,039

[22] Filed: May 2, 1980

Related U.S. Application Data

[63] Continuation-in-part of Ser. No. 32,559, Apr. 23, 1979, abandoned.

[51] Int. Cl.³ .............................................. F16L 27/10
[52] U.S. Cl. ....................................... 285/5; 285/178; 285/234
[58] Field of Search ................. 285/234, 231, 178, 49, 285/223, 54, 51, 224, 5, 6; 137/899.1

[56] References Cited

U.S. PATENT DOCUMENTS

| | | | |
|---|---|---|---|
| 2,896,972 | 7/1959 | Zavertnik | 285/54 X |
| 3,190,680 | 6/1965 | Maly | 285/231 X |
| 3,672,572 | 6/1972 | Delfs | 239/177 |
| 3,704,034 | 11/1972 | Shire et al. | 285/178 X |
| 3,853,337 | 12/1974 | Herbert et al. | 285/234 X |
| 4,068,864 | 1/1978 | Herbert et al. | 285/49 |
| 4,076,284 | 2/1978 | Herbert et al. | 285/223 X |
| 4,103,939 | 8/1978 | Herbert et al. | 285/234 X |
| 4,198,078 | 4/1980 | Herbert | 285/223 X |

FOREIGN PATENT DOCUMENTS 21894 of 1898 United Kingdom ................ 285/178

Primary Examiner—Thomas F. Callaghan

[57] ABSTRACT

Disclosed are flexible coupling devices for strings of elongate irrigation pipes, and especially suited for overland traveling sprinkler irrigation apparatuses. The pronounced flexure coupling devices comprise insert and casing members of novel structural and spatial interrelationship which are held together with resinous elastic material that annularly surrounds the longitudinal reference-axis for the insert member, together with means to prevent abrading between the insert and casing members. Also disclosed are preferred chemical identifications for the annular elastic connector and fabrication processes for securing the connector to the structurally novel and specially spaced insert and casing members.

12 Claims, 14 Drawing Figures

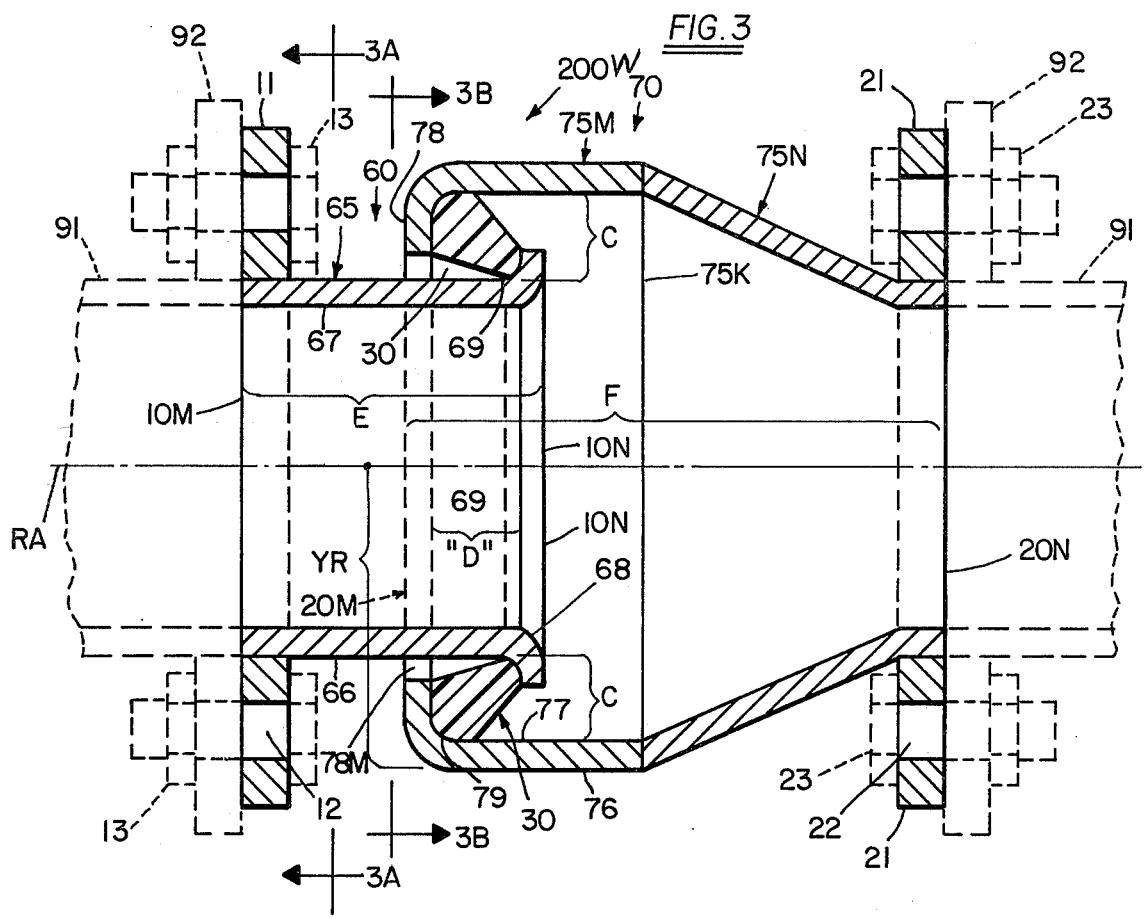
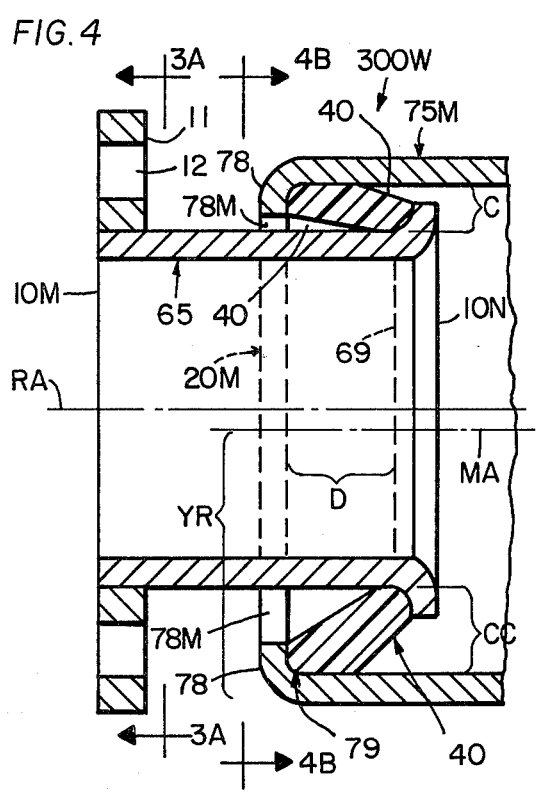
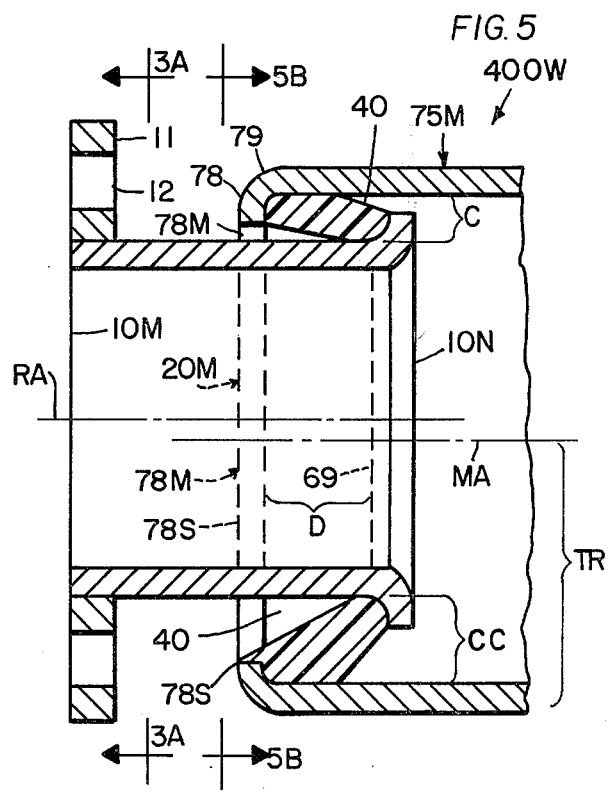

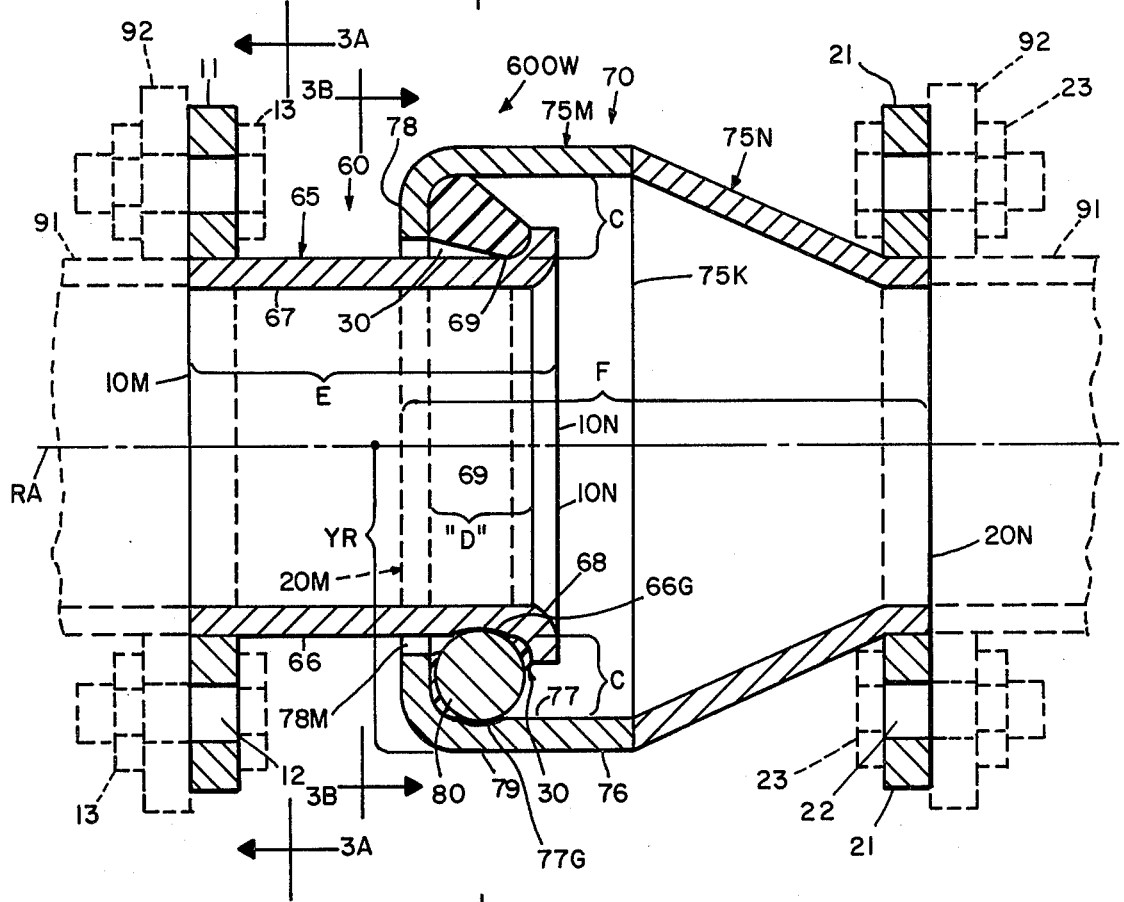
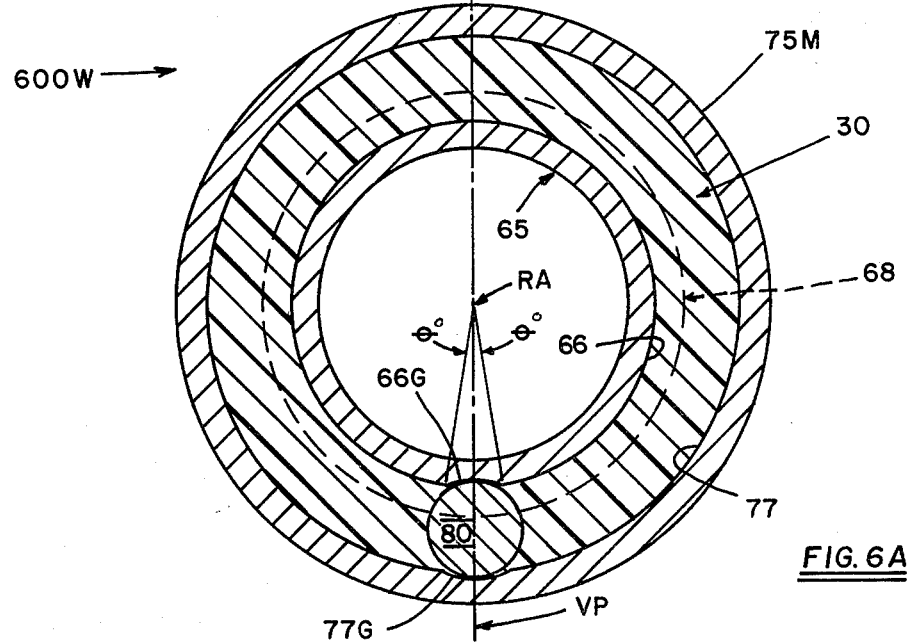

PRONOUNCED FLEXURE COUPLING DEVICES FOR ELONGATE IRRIGATION PIPES

This is a continuation-in-part of co-pending application Ser. No. 32,559 (filed Apr. 23, 1979) and now abandoned.

Overland traveling sprinkler irrigation apparatuses comprise a longitudinally extending string of elongate irrigation pipes, consecutive pipes being removably joined in end-to-end relationship with appropriate coupling devices. Such overland traveling sprinkler irrigation apparatuses are of two prevalent types, including the center-pivot type exemplified by U.S. Pat. No. 3,386,661 and the laterally moving type exemplified by U.S. Pat. No. 3,381,893. In both types, there is a plurality of underlying traction supports disposed at spaced increments along the elevated pipe string water distributing conduit means, including suitable drive means for causing the elevated elongate conduit means to travel overland. The several pipes making up the train or string-like conduit means are each of typically 100 to 180 feet in length, and these pipe segments are joined consecutively in end-to-end relationship with flexible coupling devices which are intended to permit the pipe segments to "articulate". The term "articulate" for the consecutively neighboring pipe segments includes both their angulation or relative change in elevation and also their twisting or torsional movements.

In the prior art for elevated pipe strings, the elongate pipe segments are traditionally joined together end-to-end with coupling devices having mechanical connections between insert and casing members, in the quest to permit sufficient articulation between neighboring pipe segments. Such mechanical connections between insert and casing members are alluded to in U.S. Pat. No. 1,949,055, but these have proved deficient. For one, such mechanically joined coupling devices are capable of providing only limited degrees of angular and torsional articulation, which is not of a magnitude sufficient for many undulating surface terrains like to be encountered by overland traveling irrigation machines. Secondly, and in a related vein, mechanical coupling devices when put under stress by difficult field terrain are apt to structurally fail, and periodic repair and even replacement of the inter-pipes coupling devices becomes necessary, causing labor and capital expense and probable crop damage. Though elastomeric connections between the coupling insert and casing members re alluded to in the prior art, such as in U.S. Pat. No. 4,068,864 (Herbert—1978), such prior art devices do not meet the exigincies encountered by articulating overland traveling irrigation apparatuses.

It is accordingly the general objective of the present invention to provide improved coupling devices for end-to-end lengths of elongate elevated pipes, and suitable both for center-pivot and linearly moving overland traveling sprinkling irrigation apparatuses, which coupling devices permit unusual degrees of articulation between neighboring pipes of the elongate conduit means, and without inimical abrading of the coupling device insert and casing components. It is an ancillary general objective to provide coupling devices for elevated pipe strings which are of unusually long-lasting and reliable performance, of surprisingly low cost for fabrication and maintenance, and which do not depend upon mechanical fasteners extending between the insert and casing members of the coupling device.

With the above and other objects and advantages in view, which will become more apparent as this description proceeds, the pipe string coupling devices of the present invention generally comprise a novel insert member, a novel casing member in special spatial relationship to the insert member, abrading prevention means, and an annular elastic connector between insert and casing members, the insert member comprising a tube surrounding a reference-axis superimposable along the piping-axis and having a tube-rim at one end and a first-flange at the other end for removable attachment to one of the two flanking pipes, the casing member comprising a yoke, a casing-rim, and a casing-flange which as the coupling second-flange is removably attachable to the second flanking pipe, and the annular elastic connector being adhered to (and extending both radially and longitudinally between) the novel and specially spatially separated tube-rim and casing-rim thereby permitting pronounced articulation of the coupled flanking pipes, and there being abrading prevention means to prevent the casing and insert members from inimicably abrading during exagerated articulations of the flanking pipes environment.

In the drawing, wherein like characters refer to like parts in the several views, and in which:

FIG. 3 is a longitudinally extending sectional elevational view similar to FIG. 2 of a second embodiment coupling device;

FIG. 3A is a transversely extending sectional elevational view taken along lines 3A—3A of FIGS. 3, 3C, 4 and 5;

FIG. 3B is a transversely extending sectional elevational view taken along lines 3B—3B of FIGS. 3 and 3C;

FIG. 3C is a longitudinally extending sectional elevational view showing the FIG. 3 representative embodiment wherein the flanking pipes environment is in a pronounced state of articulation;

FIG. 4 is a longitudinal extending sectional elevational view akin to FIGS. 2 and 3 of a third embodiment coupling device;

FIG. 5 is a longitudinally extending sectional elevational view showing a modified form of the FIG. 4 embodiment;

FIG. 6 is a longitudinally extending sectional elevational view of yet another embodiment coupling device; and FIG. 6A is a transversely extending sectional elevational view taken along line 6A—6A of FIG. 6.

Figure 1:
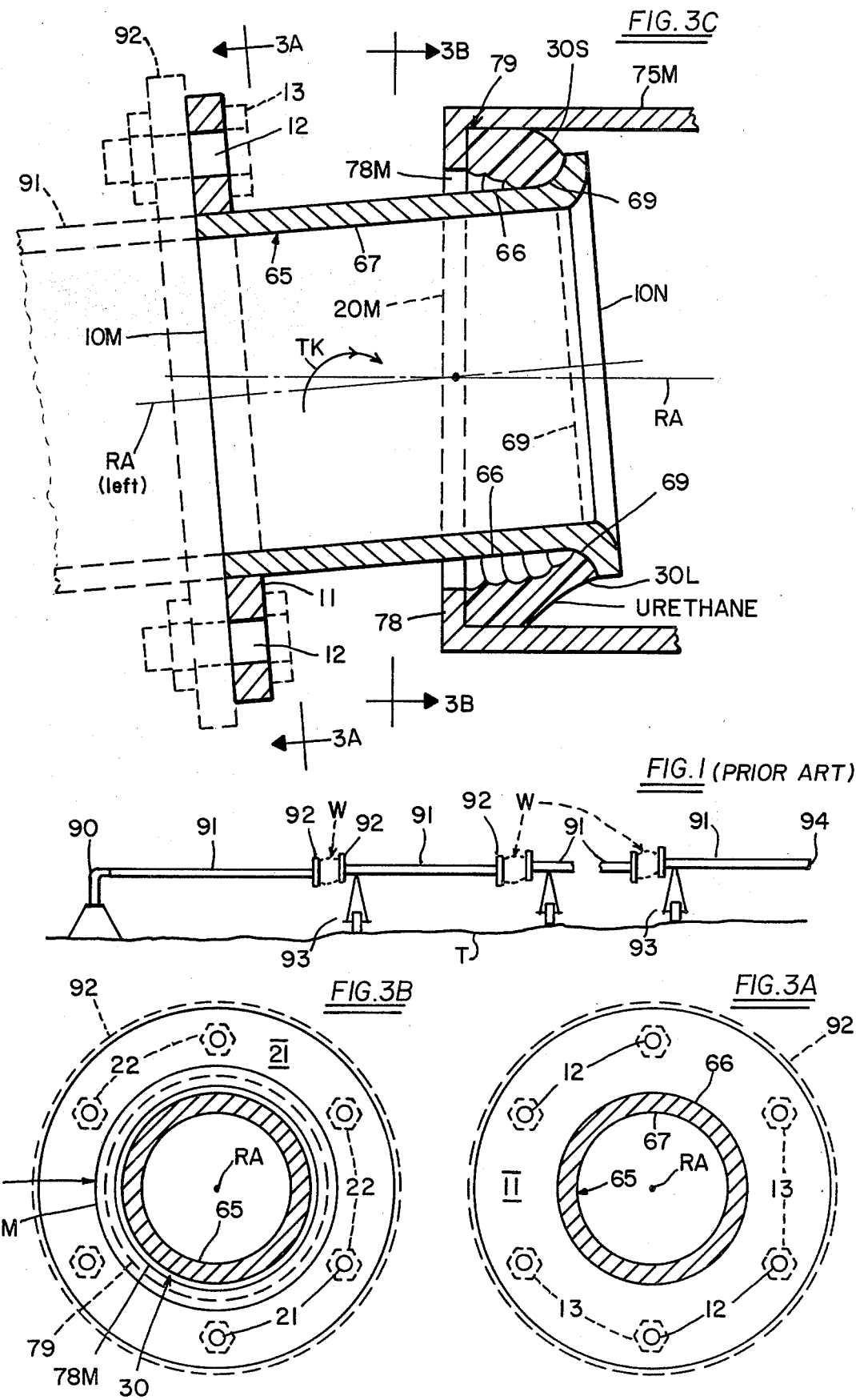
FIG. 1 is a longitudinally extending schematic view indicating a typical environment in which the elevated pipes coupling devices of the present invention might be employed.

As previously indicated, the flexible coupling devices e.g. 100W, 200W, 300W, 400W, 600W, etc., of the present invention have special utility for coupling strings of elevated elongate pipes e.g. 91. In this vein, the coupling devices are especially well suited for irrigation apparatuses comprising elevated pipe trains and which are made to travel overland. As indicated in FIG. 1, the elongate pipe segments 91 are typically removably held in end-to-end relationship with coupling devices "W" of the prior art. The pipe train 91—91, etc., is supported upon a series of incrementally spaced underlying supports 93 having drive means for motivating the apparatus over the encountered underlying terrain "T". The FIG. 1 irrigation apparatus is of the center-pivot type having the inner-end of the pipe string 91—91—91, etc., affixed to stationary water supply 90 whereby the outer-end 94 circumscribes a circle about 90. However, the pronounced flexure coupling devices of the present invention are equally suited for linearly moving, rectilinear and other types of overland traveling irrigation apparatuses.

Common to all embodiments of the coupling devices of the present invention are terminal upright flanges 11 and 21 for removably attaching to the two neighboring elongate pipes 91 at their terminal flanges 92 with usual threaded bolts 13, 23, passing through flange apertures 12, 22, respectivey, as is taught in the prior art. Though elements 11 and 21, 12 and 22, and 13 and 23, are respectively identical, such distinctive characters are herein arbitrarily employed to emphasize that first-flange 11 (having bolts 13 through holes 12) and second-flange 21 (having bolts 23 through apertures 22) define the first and second terminii, respectively, of the coupling devices. Each of the coupling device embodiments described are identified with the suffix-W e.g. 100W, 200W, 300W, 400W, and comprises an insert member e.g. 10, 60, a casing member e.g. 20, 70, and the elastic connector e.g. 30, 40.

Figure 2:
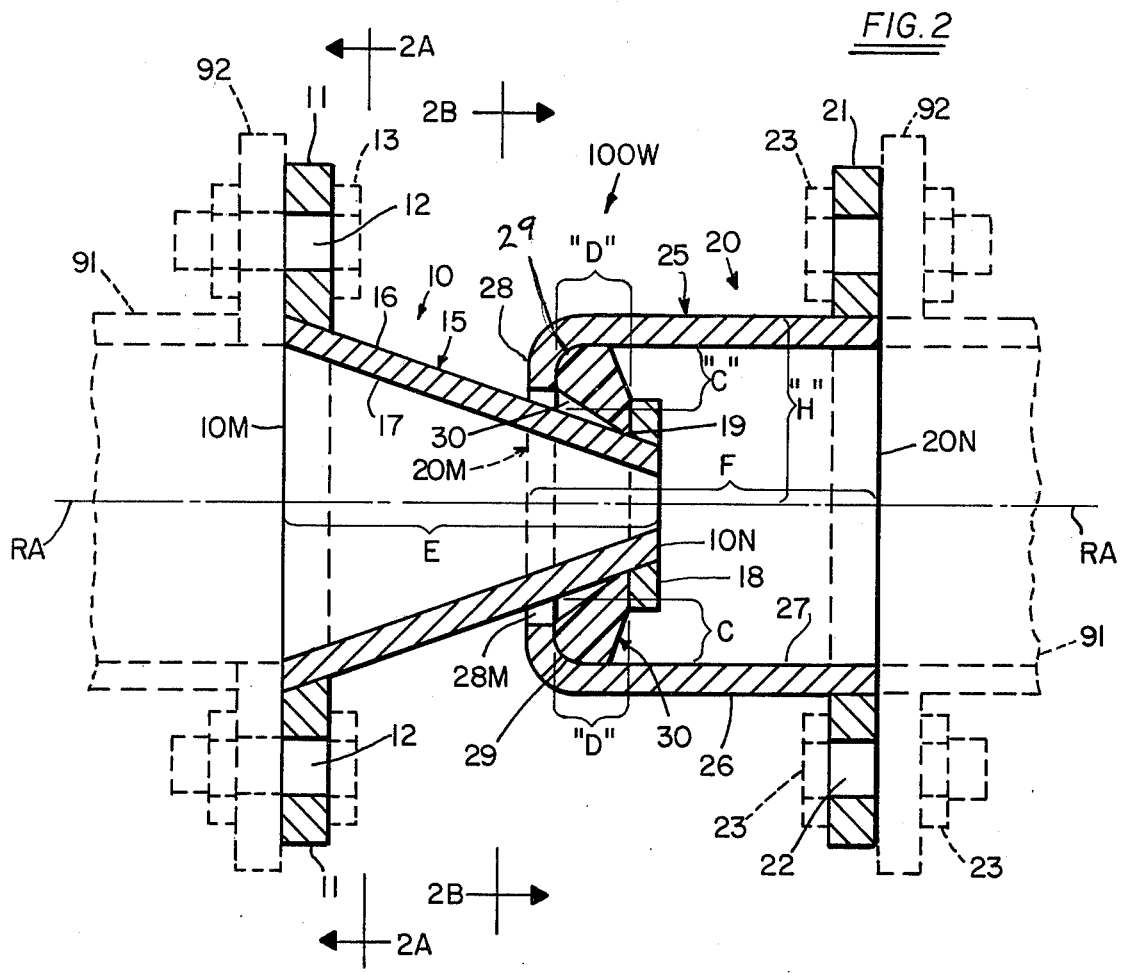
FIG. 2 is a longitudinally extending sectional elevational view of a first embodiment of the coupling device of the present invention.
Figure 2A:
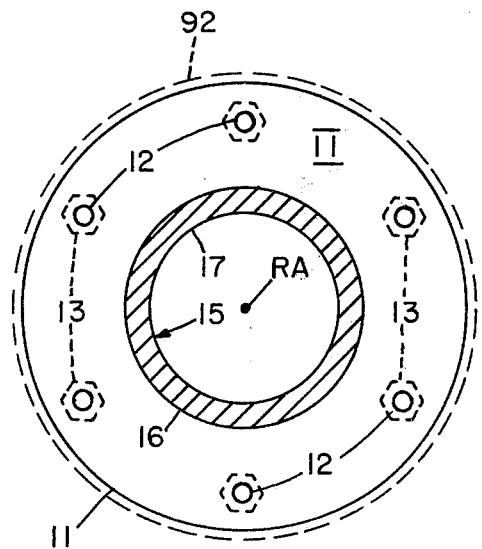
FIG. 2A is a transversely extending sectional elevational view taken along line 2A—2A of FIG. 2.
Figure 2B:
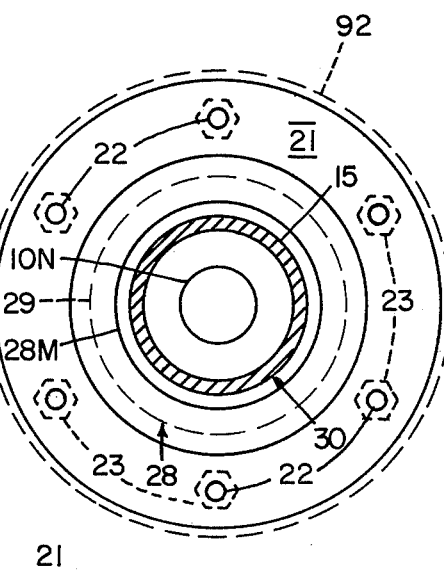
FIG. 2B is a transversely extending sectional elevational view taken along line 2B—2B of FIG. 2.
Figure 4B:
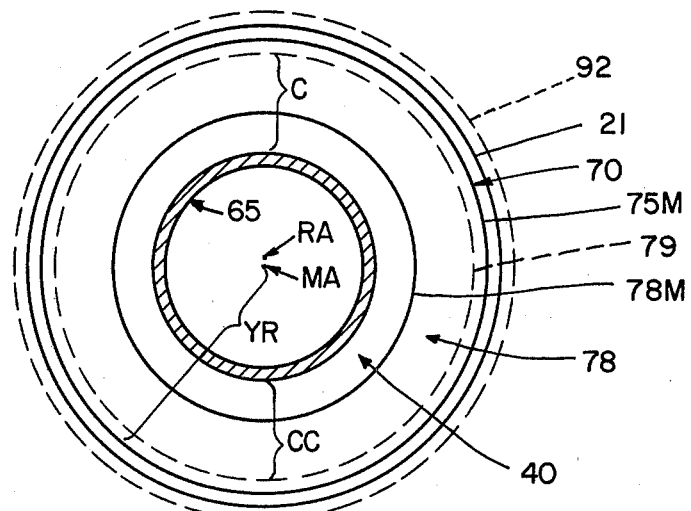
FIG. 4B is a transversely extending sectional elevational view taken along line 4B—4B of FIG. 4.
Figure 5B:
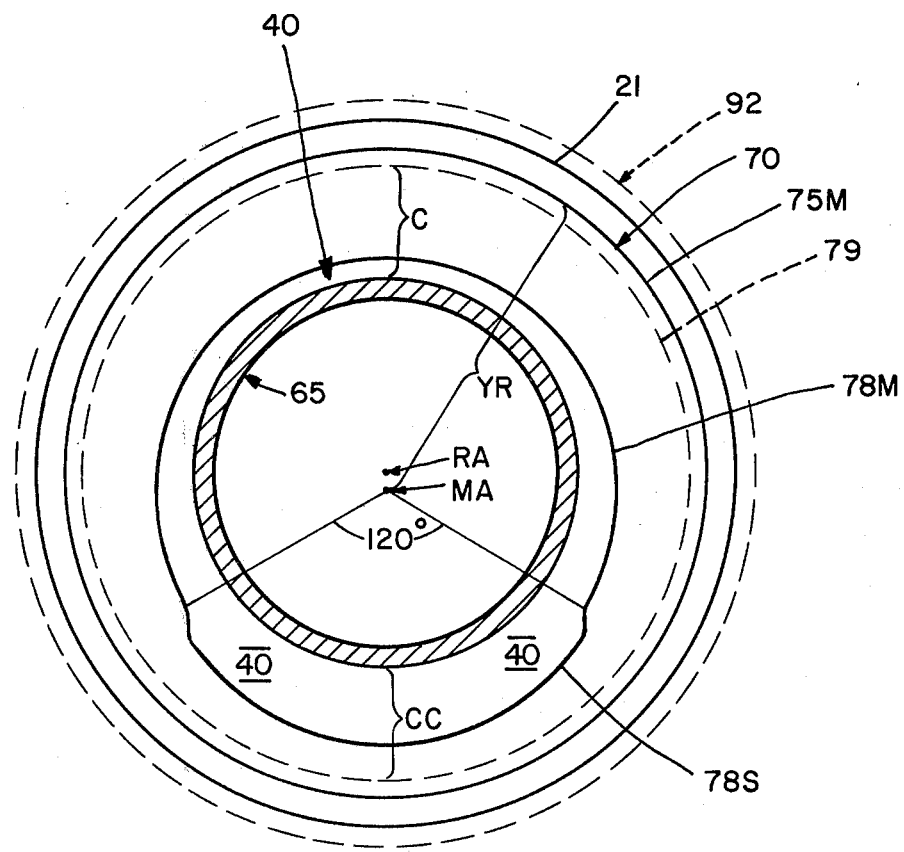
FIG. 5B is a transversely extending sectional elevational view taken along line 5B—5B of FIG. 5.

FIGS. 2, 2A, and 2B, illustrate in conjunction with embodiment 100W the general construction of the flexible coupling devices of the present invention. Insert member 10 comprises a tube 15 concentrically surrounding a longitudinally extending reference-axis "RA", tube 15 having an outside surface 16 and an inside surface 17. Extending radially outwardly from the tube outside surface 16 and defining the insert member second-end 10N is an upright tube-rim 18 circularly concentrically surrounding axis "RA" and conical surfaces 16-17. Tube-rim 18 has a corner-like merger 19 with tube outside surface 16. The insert member 10 adjacent its first-end 10M carries upright first-flange 11 extending radially outwardly from tube 15 at a radius greater than for tube-rim 18. "E" indicates the longitudinally extending finite insert-length between its terminal ends 10M and 10N. For embodiment 100W the tube 15 is of conical shape with its enlarged end at insert member first-end 10M.

The casing member 20 for embodiment 100W comprises a yoke 25, a casing-rim 28, and a casing-flange 21 as said second-flange, the casing yoke 25 surrounding the insert-rim 18 and being radially outwardly spaced therefrom. Casing member 20 at its second-end 20N carries upright second-flange 21 extending radially outwardly from yoke outside surface 26 for attachment to flange 92 of the second elongate pipe to be coupled by device 100W. The casing member 20 adjacent its first-end 20M includes said casing-rim 28 extending radially inwardly from yoke 25 toward the insert member tube 15, though casing-rim circular inward extremity 28M is radially outwardly spaced from said tube 15. The casing-rim 28 at its root delineation with yoke inside surface 27 is radially spaced a finite root-radius "C" from the tube outside surface 16. Also, said root 29 is longitudinally spaced a finite root-length "D" from the tube-rim 18. "F" indicates the longitudinally extending casing-length between its terminii 20M and 20N, and "H" is its radius from axis "RA".

The elastic connector 30 is annularly adhered along the tube-rim portions 18-19 and is similarly annularly adhered along the casing-rim portions 28-29 whereby connector 30 completely annularly surrounds axis "RA". Thus, the elastic connectors 30 and 40 have both a longitudinal extent "D" and a radial extent "C" to permit the pronounced reliable flexure between insert and casing members whenever induced by angular and torsional articulations between the flanking pipes 91. In this regard, it has been determined that the root-length "D" should be sufficiently lengthy to permit adequate flexure between the insert and casing members, though not too lengthy lest the elastic connector break away from the casing-rim e.g. 28-29, 78-79, or from the tube-rim e.g. 18-19, 68-69. Accordingly, the ratio of root-length "D" to root-radius "C" should be within the numerical range of two-thirds to two, and preferably within the narrower numerical range of three-fourths to one and three-fourths. Morever, the elastic connector e.g. 30, 40, should have the tapered cross-section seen in FIGS. 2, 3, 4, and 5, it being thicker at the casing-rim than at the tube-rim.

Embodiment 200W depicted in FIGS. 3 and 3B differs from embodiment 100W primarily in that; insert member tube 65 is of cylindrical shape, casing 70 has a bell-shaped yoke 75M-75N, and casing-length "F" exceeds insert-length "E". Insert member 60 of embodiments 200W, 300W, and 400W, comprise a cylindrical tube 65 concentrically surrounding axis "RA", tube 65 having an outside surface 66 and an inside surface 67 both surfaces circularly surrounding axis "RA". Insert member 60 at its first-end 10M carries said flange 11, herein welded to tube 65. Tube-rim 68 at insert second-end 10N is provided by terminally outwardly flaring the tube 65 resulting in a corner-like merger 69 with outside surface 66, merger 69 functioning analagously to merger 19. Inasmuch as insert member tube 65 of embodiments 200W and 300W are cylindrical rather than the conical form 15 of embodiment 100W, casing 70 yoke-radius "YR" needs to exceed value "H" whereby in embodiments 200W and 300W the casing-length "F" exceeds the insert-length "E". In this vein, the casing yoke (75) is desireably made in two parts including generally cylindrical part 75M annularly welded along seam 75K to a tapered neck part 75N. Casing yoke part 75M concentrically surrounds insert-rim 68 and is radially outwardly spaced therefrom. Casing member 70 at its second-end 20N carries said upright second-flange 21, herein surrounding and welded to the narrowed end of tapered yoke part 75N.

Casing-rim 78 at casing first-end 20M, and analagous to casing-rim 28, extends radially inwardly from yoke cylindrical part 75M toward insert member tube 65, though its circular inward extremity 78M is radially outwardly spaced from tube 65. Casing-rim 78 at its root delineation 79 with yoke inside surface 77 is radially spaced a finite root-radius "C" from tube outside surface 66. Also, said root 79 is longitudinally spaced a finite root-length "D" from tube-rim 68. Annular elastic connector 30 is annularly adhered along the tube-rim 68-69 and also annularly adhered along casing rim 78-79 whereby connector 30 completely surrounds axis "RA".

FIG. 3C indicates a pronounced state of relative articulation between the two flanking pipes 91 induced by terriain "T", character "RA(left)" indicating that there is angular direction articulation of the leftward pipe 91 (and the rigidly attached insert member 60), and the double-headed curved arrow "TK" indicates torsional direction articulation about axis "RA" between neighboring pipes 91. The angular direction component of this articulation causes connectors 30 and 40 to assume oppositely disposed compressed (30S) and stretched (30L) portions, and the torsional component "TK" causes a spiral twisting of connectors 30 and 40, schematically indicated in FIG. 3C adjacent tube outside surface 66. As will be amplified later in greater detail, nomenclature "URETHANE" is used in FIG. 3C to indicate preferred structural materials for the elastic connectors 30 and 40.

When elongate pipes 91 of larger diameters and intervening couplers are actually conducting water along axis "RA", the combined weights of pipes, coupler, and water tends to cause the insert member tube e.g. 15, 65, to inimicably abrade against the casing-rim inner extremity 28M, 78M. However, the instant invention overcomes this problem with abrading prevention means e.g. 40, 80. Elastic connector embodiment 40 has its center-of-gravity lying below a horizontal plane passing through central-axis "RA" of the insert member, thus providing embodiment 40 of the abrading prevention means. Elastic connector 40 of coupling embodiments 300W and 400W differs from elastic connector 30 of embodiments 100W, 200W, and 600W in that connector 30 concentrically surrounds axis "RA", while connector 40 concentrically surrounds a casing-axis or "mold-axis" "MA" located below and parallel to reference-axis "RA". Because of this lower elevation for axis "MA", for connector 40 to the radial distance "CC" between the casing-rim root (79) below axis "MA" exceeds the root-radius "C" located thereabove by some 5% to 15%. The resulting greater thickness "CC", as compared to thickness "C", is suited as abrading prevention means between durable e.g. metallic, insert and casing members.

For even larger diameters of pipes 91, the elastic connector 40 enlarged radial distance "CC" might not be sufficient by itself to prevent abrasion between insert member tube 65 and casing-rim inward extremity 78. Accordingly, the casing-rim below axis "MA" might be scalloped or otherwise pared prior to the adhesion of connector 40, to further increase the radial distance between the casing-rim inward extremity and insert tube 65. This paring-away of the casing-rim below axis "MA" results in casing-rim pared extremity 78S. The non-pared intact casing-rim inward extremity 78 provides some 210° to 240° with respect to casing-axis "MA", the pared remainder (120° to 150°) 78S having elastic connector 40 adhered thereat.

The abrading prevention means for embodiment 600W of FIGS. 6 and 6A comprises a spacer member e.g. metallic spherical ball 80, located wholly below axes "RA" and "MA" and extending uprightly between and physically spatially separating the insert member tube 65 and the casing member yoke 75M. Spacer 80, relegated in elevation below insert member tube 65, is medially intersected by an imaginary vertical-plane "VP" lying along horizontal reference-axis "RA". In longitudinal position, spacer 80 is relegated between the insert member second-end (10N, 68) and the casing member first-end (20M, 78). To further ensure such longitudinal confinement of spacer ball 80, and without retarding the desireable articulatability alluded to in FIG. 3C, insert tube outside surface 66 is provided with grooved recess 66G and the casing yoke inside surface 77 is provided with grooved recess 77G. As seen in FIG. 6, the longitudinal extent of grooves 66G and 77G exceeds the overall longitudinal length of spacer 80. And, as clearly indicated in FIG. 6A, the angular extent of grooved recesses 66G and 77G about axis, "RA" is within the total range of 2° to 10°, equally divided by vertical-plane "VP".

For the elastic connectors 30 and 40, resinous structural materials having unusual compressibility (30S), elasticity (30L), and twistability ("TK"), are necessary. In addition, the resinous structural material for elastic connectors 30 and 40 must have unusually tenacious bondability to the insert members e.g. at 18-19, 68-69, and to the casing members e.g. at 28-29, 78-79, which insert and casing members are normally of metallic construction. For meeting the aforesaid requirements of the resinous structural material, URETHANES i.e. polyurethane elastomers, are especially admirably suited. One such well suited polyurethane is a copolymer with 1,4-butanediol. The non-cured form of the elastomer is fed into a heatable mold containing therein the insert and casing members spatially maintained at the desired dimensions "C" and "D", and if appropriate, the dimensions "CC" and 78S and spacer 80. After sufficient cure time in the presence of the heated mold, the resultant urethane polymer is annularly adhered to the insert and casing members thereby completing the elasticized coupling device e.g. 100W, 200W, 300W, 400W, 600W.

A preferred procedure for adherably establishing the elastic connector (30, 40) onto the insert and casing members is as follows. First, the urethane pre-polymer is melted and de-gassed for some 20-25 minutes at 140°-150° F. Second, the required stoichiometric quantity of 1,4-butanediol is mixed with the urethane pre-polymer at 180°-200° F., accompanied by stirring and de-gassing of the mixture. Third, the metallic insert and casing members at the appropriate areas e.g. 18-19, 68-69, 28-29, 78-79, are cleansed, as by shot-blasting, and then adhesive applied thereat. A particularly apt adhesive is "Thixon 1153" manufactured by Whittaker Coatings and Chemicals Co. of West Alexandria, Ohio. Fourth, the insert and casing members are placed in an oven of about 230° F. for one-hour to bake-on the adhesive. Fifth, a mold release agent is applied to the appropriate areas of the mold fixture. A particularly apt mold release agent is "Kraxo 1711" manufactured by Contour Chemical Co. of Woburn, Mass. Sixth, and finally, the mixture of step two above is fed into the mold at the appropriately spaced e.g. "C", "D", "CC", 78S, 80, insert and casing members and cured for an hour or more at substantially 230° F. to complete the polymerized and adherent elastic connector e.g. 30, 40.

From the foregoing, the construction, operation, and fabrication of the pronounced flexure coupling devices for irrigation pipes will be readily understood and further explanation is believed to be unnecessary. However, since numerous modifications and changes will readily occur to those skilled in the art, it is not desired to limit the invention to the exact constructions shown and described, and accordingly, all suitable modifications and equivalents may be resorted to, falling within the scope of the appended claims.

What is claimed is as follows:

1. In combination with consecutively neighboring pipe segments of a longitudinally extending overland traveling sprinkler irrigation apparatus, a coupling device terminally provided with upright first-flange and second-flange for removably coupling consecutive longitudinally extending elongate pipe segments of said irrigation apparatus, said coupling device comprising an insert member, an outer casing member, and an annular elastic connector permitting pronounced relative flexure between the insert and casing members according to angular and torsional articulations of the apparatus environment pipe segments:

A. said insert member comprising an insert-tube concentrically surrounding longitudinally extending reference-axis and having at the second-end thereof an upright tube-rim extending radially outwardly from the insert-tube and surrounding the reference-axis, said insert member adjacent the first-end thereof carrying an upright first-flange extending radially outwardly from the insert-tube and surrounding the reference-axis at a radius exceeding that for the tube-rim, the insert member having a longitudinally extending finite insert-length between its said first and second upright ends;

B. said casing member comprising a yoke, a casing-rim, and a casing-flange, the casing yoke, surrounding said tube-rim and being radially outwardly spaced therefrom, the casing member at its second-end carrying an upright casing-flange extending radially outwardly from the yoke and functioning as said second-flange, the casing member adjacent its first-end having said casing-rim extending radially inwardly from the yoke so as to surround and be radially outwardly spaced from the insert member tube-rim, said casing-rim at its root delineation with the yoke being radially spaced a finite root-radius from the insert-tube, said root delineation being longitudinally spaced a finite root-length from the tube-rim and being in longitudinal position between the insert member tube-rim and first-flange, the ratio of root-length to root-radius being within the range of substantially two-thirds to two;

C. said annular elastic connector completely surrounding the reference-axis and being annularly adhered to both the tube-rim and the casing-rim including along the annular casing root, whereby said annular connector in longitudinal cross-section extends both longitudinally and radially between the insert and casing members and having a convergent configuration from the casing-rim to the tube-rim; and D. abrading prevention means to prevent the casing and insert members from making abrasive physical contact during exaggerated articulations of the flanking elongate pipe segments environment.

2. The coupling device of claim 1 wherein the abrading prevention means comprises the center-of-gravity for the annular elastic connector lying below a horizontal plane passing through said reference-axis, whereby the elastic connector is especially resistant to downward forces caused by the weighty irrigation fluid flowing through the flanking elongate pipe segments and intervening coupling device.

3. The coupling device of claim 2 wherein the casing member yoke and casing-rim circularly concentrically surround a longitudinally extending casing-axis parallel to and located below said reference-axis whereby the radial distance between the casing-rim lower portion and the insert-tube is greater than the radial distance between the casing-rim upper portion and said insert-tube.

4. The coupling device of claim 3 wherein the casing-rim below the casing-axis is scalloped away to further decrease the radial distance between the casing-rim lower portion and the insert-tube, whereby the abrading prevention means is augmented.

5. The coupling device of claim 4 wherein the casing-rim scalloped lower portion is filled with said elastic connector material, said elastic material being adhered to said scalloped portion.

6. The coupling device of claim 1 wherein the insert member tube and the tube-rim circularly concentrically surround the reference-axis; wherein the casing member yoke is substantially bell-shaped and relatively enlarged at the casing-rim first-end, the casing member having a longitudinally extending casing-length between its first and second ends that exceeds said finite insert-length, and wherein said ratio of root-length to root-radius is within the range of about three-fourths to $1\frac{3}{4}$.

7. The coupling device of claim 5 wherein the casing-rim scalloped portion is confined to a sector not exceeding about one-third of the casing-rim.

8. The coupling device of claim 1 wherein the insert member tube concentrically surrounds the reference-axis; and wherein the abrading prevention means comprises a spacer located wholly below the reference-axis and extending uprightly between and physically spatially separating the insert-tube and the casing yoke, said spacer being relegated in longitudinal position between the tube-rim and the casing-rim and being embedded within the relatively softer elastic connector.

9. The coupling device of claim 8 wherein the insert-tube and the casing yoke at said spacer are provided with longitudinally extending grooves.

10. The coupling device of claim 8 wherein the spacer is metallic and of spherical shape.

11. The coupling device of claim 10 wherein the casing yoke circularly concentrically surrounds the reference-axis and insert-tube.

12. The coupling device of claim 11 wherein the insert-tube and the casing yoke at said spherical spacer are provided with longitudinally extending grooves lengthier than the spacer, each groove also having an angular extent about said reference-axis within the overall range of 2° to 10°.

* * * * *